United States Patent [19]
Coupland et al.

[11] Patent Number: 5,437,933
[45] Date of Patent: Aug. 1, 1995

[54] COATED CERAMIC ARTICLE

[75] Inventors: Duncan R. Coupland, High Wycombe; Helena E. Hunt, Witney, both of United Kingdom

[73] Assignee: Johnson Matthey Public Limited Company, London, England

[21] Appl. No.: 12,422

[22] Filed: Feb. 2, 1993

[30] Foreign Application Priority Data

Feb. 18, 1992 [GB] United Kingdom ............ 9203394

[51] Int. Cl.$^6$ ............................................. B32B 15/04
[52] U.S. Cl. ................................ 428/469; 428/336; 428/472; 428/697; 428/699; 428/701; 428/702
[58] Field of Search ............... 428/457, 469, 472, 471, 428/689, 697, 702, 699, 701, 336

[56] References Cited

U.S. PATENT DOCUMENTS

| | | | |
|---|---|---|---|
| 3,136,658 | 6/1964 | Richards | 428/471 |
| 4,159,353 | 6/1979 | Adelsberg | 427/34 |
| 4,418,099 | 11/1983 | Cuevas et al. | 427/229 |
| 4,913,973 | 4/1990 | Geusic | 428/469 |
| 4,917,958 | 4/1990 | Akai | 428/457 |
| 5,173,354 | 12/1992 | Raj | 428/457 |

FOREIGN PATENT DOCUMENTS

| | | |
|---|---|---|
| 0492323 | 7/1992 | European Pat. Off. |
| 57-14478 | 1/1982 | Japan. |
| 2254144 | 3/1989 | Japan. |
| 611221 | 10/1948 | United Kingdom. |
| 710079 | 6/1954 | United Kingdom. |
| 958784 | 5/1964 | United Kingdom. |
| 961315 | 6/1964 | United Kingdom. |
| 1242996 | 8/1971 | United Kingdom. |
| 1406394 | 9/1975 | United Kingdom. |
| 1461484 | 1/1977 | United Kingdom. |
| 1533628 | 11/1978 | United Kingdom. |
| 2038884 | 7/1980 | United Kingdom. |
| WO8705947 | 10/1987 | WIPO. |

*Primary Examiner*—Archene Turner
*Assistant Examiner*—Timothy M. Speer
*Attorney, Agent, or Firm*—Stevens, Davis, Miller & Mosher

[57] ABSTRACT

A ceramic article for use at high temperatures and in corrosive environments comprises a ceramic substrate on which is deposited a substantially non-porous coating of one or more precious metals or alloys thereof.

12 Claims, No Drawings

COATED CERAMIC ARTICLE

This invention relates to a coated refractory ceramic article.

BACKGROUND OF THE INVENTION

Refractory ceramics are used in a wide variety of industries and in a wide range of applications, often where high temperature, corrosive environments are involved, such as in the manufacture of glass materials, products and components, where ceramic thermocouple protection sheaths, bubbler tubes, orifice rings, stirrers and other process equipment are employed.

For example, the measurement of the temperature of hot molten glass is performed by a thermocouple shielded in a protecting sheath. Such measurement presents a variety of problems, associated with the temperature involved, the high viscosity and abrasiveness of the molten glass, the chemical reactivity of the glass and the combustion atmosphere in which it is heated. The function of the protecting sheath is to retain the thermocouple in an environment where it is shielded from mechanical and chemical damage. Commonly, the protecting sheath is of alumina. However, while such sheaths have high temperature capability they are relatively brittle. Additionally they suffer attack by molten glass which is often sufficiently severe to cause rapid failure and total loss of protection for the thermocouple.

Platinum group metal (PGM) and platinum group metal alloys have been used as alternative shielding materials, as too have zirconia grain stabilized (ZGS) versions of the alloys. Maximum structural integrity of these sheaths requires metal thicknesses of 0.5–0.8 mm, so the sheaths are very expensive. Internal support by ceramic tubes has allowed this thickness to be reduced to its present commonly used level of approximately 0.3 mm, but results in sheaths which require mechanical design compromises and which are still too intrinsically expensive.

Apparatus fabricated with a metallic substrate that is coated or clad with platinum group metal provide protection and enable the service life to be increased, but application temperatures are limited by substrate melting point. For example, the use of Ni alloy substrates limits working temperature to below 1300° C. and in most cases below 1200° C. The use of refractory metals can extend working temperatures to as high as 1600° C. but the penalty paid for this is the need to protect all surfaces which might ever see temperatures greater than 400°–600° C. Ceramic substrates offer an alternative vehicle for application particularly in this higher temperature range.

Platinum group metal-clad ceramics have traditionally filled this temperature niche. However, the air gap which is present between the metal cladding and the ceramic reduces the responsiveness of the enclosed thermocouple to temperature changes and the sheaths produced suffer from poor resistance to thermal and mechanical shock. Clad ceramics are two-piece structures and the components have the attributes of metals for the cladding, and ceramics for the substrate.

Traditionally, ceramics directly coated with platinum group metals have failed to produce economically articles with durability suitable for use in high temperature and corrosive environments. Traditional coating processes suffer from stress build-up during deposition and generally provide a limitation for the coating thickness via a particular application route. Such thicknesses are generally insufficient to provide the protection required. Where a coating process has been capable of producing coatings of a satisfactory thickness, other problems have traditionally been manifest,: eg with adhesion, and/or mechanical strength, and/or integrity, and/or porosity.

GB 1242996 (Corning Glass) discloses a method of applying a platinum coating onto ceramics by plasma spraying. It is said that flame spraying is not capable of producing adherent, non-porous coatings. We are not aware that coated ceramics produced according to the process of GB 1242996, or by any other process, were ever successfully commercialized.

SUMMARY OF THE INVENTION

The object of the present invention is to provide a ceramic article suitable for use in any application where high temperatures and/or corrosive environments are present, which article overcomes at least some of the problems of the prior art.

Accordingly, this invention provides a ceramic article for use at high temperatures and in corrosive environments comprising a refractory ceramic substrate on which is deposited a coating of one or more precious metals or alloys thereof said coating having a thickness of from 50 to 350 microns and being substantially non-porous.

The invention further provides a method of making a ceramic article for use at high temperatures and in corrosive environments, comprising applying to a refractory ceramic substrate by flame spraying a coating of one or more precious metals or alloys thereof in a thickness of from 50 to 350 microns, and making the coating substantially non-porous.

The substrate may be any suitable oxide or non-oxide engineering or refractory ceramic material such as alumina, alumina silicate, zircon-mullite, zirconia, mullite, silica or titania. Preferably, the substrate is an alumina- or zirconia-based material, or a mullite-based material. Most importantly, the ceramic and the coating system must be compatible in their thermal expansion coefficients in order to avoid undesirable stresses in the article in use.

The substantially non-porous coating is chosen from one or more of the precious metals. Preferably the coating is of platinum or an alloy of platinum e.g. platinum with 5% gold, or platinum with 10% iridium, platinum with 5% ruthenium, or platinum with 10% rhodium, or platinum with up to 1% zirconium. Lower or higher percentages of the alloying metals may also be used, including compositions traditionally difficult to manufacture in forms suitable for cladding. Other platinum group metals may also be employed particularly palladium and alloys based on palladium.

The coating is deposited by flame spraying, for example by high velocity oxy fuel gas spraying. In a preferred flame spraying process, the source of precious metal is in wire form, rather than the powder required by the other techniques. Suitable equipment is commercially available. The external surface of the coating is made substantially non-porous by treatment of the coating after deposition comprising, for example, shot peening, flame glazing or mechanical burnishing. The thickness of the coating is typically 50–350 $\mu$m, such as 100–350 $\mu$m, and is preferably at least 125 $\mu$m.

DETAILED DESCRIPTION OF PREFERRED EMBODIMENTS

The article of the present invention benefits from a range of attributes. It has good resistance towards the diffusion of oxidants through to the substrate provided by a high aspect ratio microstructure of the coating, and requires considerably less precious metal than the prior art articles. The intimate contact achieved between the ceramic substrate and the metal coating eliminates any thermocouple response limitations due to air gap considerations. The high quality of the structure and its inherent thermal and electrical properties allows platinum group metal and alloy coatings to act as electromagnetic shields for the thermocouples, and hence improve their signal quality with reduced noise levels. The composite structure achieved by the creation of sound interfacial characteristics, related to the substrate surface conditions, and carefully controlled coating deposition parameters, allows the metal coating to lend metal attributes to the ceramic and vice versa, and results in a structural material superior to that of the prior-art clad ceramic. This allows use of the component where thermal and mechanical stresses might previously have been too great. The achievement of the sound interface may be brought about by preliminary, chemical, mechanical or thermal preparation of the substrate. Such treatments might include machining, grit blasting, degreasing, or acid etching.

The process employed in this application produces a low stress deposit, which can be built up to structural thicknesses if required. Complex shaped structures which cannot readily be clad, may be protected. The thickness of the coating can be varied substantially to ensure the correct level of protection is available in different areas of the component. Also, once the correct interfacial characteristics have been achieved, further depositions of the same or different PGMs and alloys can be put down on local regions.

Oxides or inert particulates may be used to pin grain boundaries in the coatings of the present invention. At high temperatures over long periods of time, platinum group metal based alloys, and particularly pure metals, can exhibit extensive structural change and grain growth. These characteristics can lead to in-service failure. Pinning grain boundaries can offset or delay such microstructural changes. The inert particulates, such as zirconia in ZGS alloys, may be included directly in the coating during deposition, or be generated by post-deposition treatment, depending on the requirements with regard to composition, size and distribution. Conventionally, claddings of ZGS alloys have been prepared, but these have required joining to create complex shapes. Joints can in any circumstance be potentially weak, thus the elimination of the need for joining by the use of coating technology is a significant advance.

If desired an additional coating may be added between the substrate and the precious metal coating, either individually or comprising a mixture of one or more ceramics and one or more precious metals or alloys thereof. The additional coating may be formed by thermal spraying, for example by flame or vacuum- or air- plasma spraying, or by the deposition of one or more layers. A plurality of layers may be employed to form a step-wise gradation of the ceramic to metal ratio. Conventionally fabricated PGM product, eg sheet, strip, tube, wire can be joined to a coated component by traditional technique. Such techniques could include arc welding, hammer welding, laser- or ion-beam bonding, and spray bonding. This enables the best features of both processes to be utilized.

The invention will now be described by Example. Example 13 describes industrial service trials of the coated articles.

EXAMPLES

Examples 1–4

In each case, a sheath was coated by directly flame spraying a coating of platinum onto the substrate. A commercial flame spraying apparatus using propylene and oxygen to form the flame, and compressed air to atomize the platinum, was used. Platinum wire was fed from a reel to the flame. An after-treatment of shot-peening was applied. Testing of the coated samples was by partial immersion in flint glass held at a nominal temperature of 1350° C. for 100 hours.

| Sample | Coating | Thickness | Substrate | Result |
| --- | --- | --- | --- | --- |
| E1 | Pt | 100 μm | Mullite | Coating pin-holed above glass, otherwise OK. |
| E2 | Pt | 250 μm | Mullite | Performed well, coating protective. |
| E3 | Pt | 100 μm | Impervious aluminous porcelain | Pin-holing of coating above glass level. |
| E4 | Pt | 250 μm | Impervious aluminous porcelain | Performed well. Coating protective. |

Examples 5 and 6

In each case, a sheath was coated by directly flame spraying a coating of platinum onto the substrate. An after-treatment of shot-peening was applied.

Testing of directly deposited, coated samples was by partial immersion in amber glass held at a nominal temperature of 1350° C.

| Sample | Coating | Thickness | Substrate | Test | Result |
| --- | --- | --- | --- | --- | --- |
| E5 | Pt | 175 μm | Mullite | 200 hours | Slight grain growth. Coating protective. |
| E6 | Pt | 400 μm | Mullite | 400 hours | Grain growth. Coating protective and supported cracked substrate. |

Examples 7–9

In each case, a sheath of alumina, Development Sample Number MX3 supplied by Morgan Matroc Limited, was coated by directly flame spraying platinum onto the proprietary alumina. An after-treatment of shot-peening was applied. Testing of the coated samples was by partial immersion in flint glass held at a nominal temperature of 1250° C. for 300 hours.

| Sample | Coating | Thickness | Result |
| --- | --- | --- | --- |
| E7 | Pt | 186 μm | Coating fully protective. |
| E8 | Pt | 165 μm | Coating fully protective. |
| E9 | Pt | 178 μm | Coating fully protective. |

Example 10

The coating was directly flame sprayed onto a mullite sheath, and an after-treatment of shot-peening was applied. The sample was tested by partial immersion in amber glass at 1250° C. for 300 hours.

| Sample | Coating | Thickness | Result |
| --- | --- | --- | --- |
| E10 | 10% Ir/Pt | 200 μm | Coating discoloured but protective. |

Example 11

The coating was directly flame sprayed onto a sheath of mullite. The sample was ;thermally treated at 1200° C. for one hour in air, and an after-treatment:of shot-peening was applied. Testing was at 1250° C. for 300 hours in amber glass.

| Sample | Coating | Thickness | Result |
| --- | --- | --- | --- |
| E11 | Pt-Zr | 200 μm | Substrate protected. Grain growth restricted. |

Example 12

The coating was directly flame sprayed onto an aluminous porcelain sheath, and an after-treatment of shot-peening was applied. The sample was tested by partial immersion in flint glass held at a nominal temperature of 1430° C. for 40 hours.

| Sample | Coating | Thickness | Result |
| --- | --- | --- | --- |
| E12 | Pt | 150 μm | Pt coating provided protection. |

Example 13

Service Trials

Case 1

A coating of 10% Rh/Pt was flame sprayed directly onto a mullite sheath, and locally thickened at the glassline to 250 μm from 200 μm below the glass and 175 μm above the glass. An after-treatment of shot-peening was applied.

The coated article was tested in a commercial forehearth at 1140°–1220° C. in amber, flint and green glasses, at various times. The total service life is greater than eight months, the coated article still being on test at that stage.

Case 2

A twin layer of Pt on grain stabilised platinum was flame sprayed directly onto a mullite sheath, and shot-peened. The coating thickness was between 225 μm and 275 μm. On testing in a forehearth used for making amber glass bottles, service life was 1000 hours. The article was then removed for examination. The substrate was essentially protected.

Case 3

A silica sphere, thermally treated at 1400° C. for ca 1 hour, was directly flame sprayed with a 250 μm thick Pt coating. An after-treatment of shot-peening was applied.

The coated article was tested at 1430° C. for 1.75 hours. The temperature was cycled to an estimated 1200° C. and back once every minute, ie approximately 100 cycles.

The coating performed well but was cracking due to major failure of the substrate.

Case 4

An alumina-silicate sphere, thermally treated at 1400° C. for ca 1 hour, was directly flame sprayed with a nominal 250μm thick Pt coating. An after-treatment of shot-peening was applied.

The coated article was tested at 1340° C. (maximum) for more than 72 hours, and repeatedly cycled between maximum temperature and an estimated 1000° C. each minute.

The coated article was then cooled to room temperature and re-heated to operating temperature.

Several overnight soaks at a temperature of 1300° C. or 700° C. were also included. The coating performed extremely well, with the substrate essentially protected.

Case 5

Coating/Clad Weld

A 300 μm Pt coating was flame sprayed directly onto a mullite tube. A tube of Pt, 0.5 mm thick, was slipped over the sample, and welded using a standard tungsten inert welding (TIG) processor. The joint was intact.

The integrity was further assessed by raising the temperature to 1300° C. for one hour and then cooling to room temperature. No evidence of damage to the coating or joint was observed.

We claim:

1. A ceramic article for use at high temperatures and in corrosive environments, comprising a refractory ceramic substrate on which is flamed sprayed a coating of at least one precious metal or alloys thereof, said coating having a thickness of from 50 to 350 μm and being non-porous.

2. An article as claimed in claim 1, wherein the substrate is selected from the group consisting of alumina and zirconia.

3. An article as claimed in claim 1, wherein the substrate is mullite.

4. An article as claimed in claim 1, wherein the coating is selected from the group consisting of platinum and platinum alloys.

5. An article as claimed in claim 4, wherein the coating is selected from the group consisting of at least one of platinum, zirconia grain stabilized platinum, and zirconia grain stabilized platinum alloys.

6. An article as claimed in claim 4, wherein the alloy of platinum comprises platinum with 5% gold, or platinum with 5% ruthenium or platinum with 10% rhodium.

7. An article as claimed in claim 1, wherein the thickness of the coating is at least 125 μm.

8. An article as claimed in claim 1, wherein an additional coating comprising at least one ceramics material and at least one precious metal or alloys thereof, is positioned between the substrate and the precious metals coating.

9. An article as claimed in claim 1, wherein the flame sprayed coating, after application, has a surface which is densified by shot peening.

10. An article as claimed in claim 1, wherein the flame sprayed coating, after application, has a surface which is densified by flame glazing.

11. An article as claimed in claim 1, wherein the flame sprayed coating, after application, has a surface which is densified by mechanical burnishing.

12. A ceramic article for use at high temperatures and in corrosive environments, comprising a refractory ceramic substrate containing a flame sprayed coating of at least one precious metal or alloys thereof, said coating having a thickness of from 50 to 350 μm, said coating having a non-porous surface formed by mechanical densification of said coating after application thereof.

* * * * *

UNITED STATES PATENT AND TRADEMARK OFFICE
CERTIFICATE OF CORRECTION

PATENT NO. : 5,437,933
DATED : AUGUST 1, 1995
INVENTOR(S) : Duncan R. COUPLAND et al.

It is certified that error appears in the above-indentified patent and that said Letters Patent is hereby corrected as shown below:

On cover page, THE APPL. No.: at [21] should read --12,442--.

Signed and Sealed this

Nineteenth Day of September, 1995

Attest:

BRUCE LEHMAN

*Attesting Officer*    *Commissioner of Patents and Trademarks*